United States Patent [19]

Bouter et al.

[11] 4,069,634
[45] Jan. 24, 1978

[54] GROUND EFFECT VEHICLE STRUCTURE

[75] Inventors: Roger Jean Bouter; Robert Rene Jaffre, both of Lorient, France

[73] Assignee: Etat Francais, Paris, France

[21] Appl. No.: 675,060

[22] Filed: Apr. 8, 1976

[30] Foreign Application Priority Data

Apr. 11, 1975 France .................... 75 11304

[51] Int. Cl.² .............................................. B60V 1/00
[52] U.S. Cl. ........................................ 52/648; 180/116
[58] Field of Search ............. 52/693, 645, 694, 633, 52/690, 650, 84, 655; 403/271, 272; 296/1 R; 180/126, 116

[56] References Cited

U.S. PATENT DOCUMENTS

| | | | |
|---|---|---|---|
| 2,578,465 | 12/1951 | Davis, Jr. et al. | 52/694 X |
| 2,855,885 | 10/1958 | Thomas | 180/116 X |
| 3,066,753 | 12/1962 | Hurley et al. | 180/126 X |
| 3,168,928 | 2/1965 | Ljungstrom | 180/116 |
| 3,477,189 | 11/1969 | Merson | 52/648 |
| 3,583,121 | 6/1971 | Tate et al. | 52/694 X |
| 3,675,385 | 7/1972 | Chan | 52/650 X |
| 3,975,107 | 8/1976 | Molyneux et al. | 403/271 |

FOREIGN PATENT DOCUMENTS

| | | | |
|---|---|---|---|
| 235,554 | 9/1964 | Austria | 52/650 |
| 1,401,266 | 4/1965 | France | 52/648 |
| 1,812,472 | 7/1969 | Germany | 180/116 |
| 534,267 | 3/1941 | United Kingdom | 52/633 |

*Primary Examiner*—Leslie Braun
*Attorney, Agent, or Firm*—Larson, Taylor & Hinds

[57] ABSTRACT

Air cushion vehicle structure comprises a platform with a grid frame formed of longitudinal girders crossing crosspieces, and an upstanding caisson or compartment formed of transverse frames connected by continuous systems of sheets. The lower segment of each caisson transverse frame is constituted by a portion of the upper beam of a crosspiece of the platform, and the lower longitudinal edges of the caisson are integrated with the upper beams of two girders. The crosspieces and some girders are lattice girders, but the others are ladder girders. Upper and lower beams of the girders and the crosspieces are connected by normal tubes welded to their feet, the oblique tubes of the lattices also being welded to the feet. The structure is especially appropriate for medium tonnage ACV.

9 Claims, 9 Drawing Figures

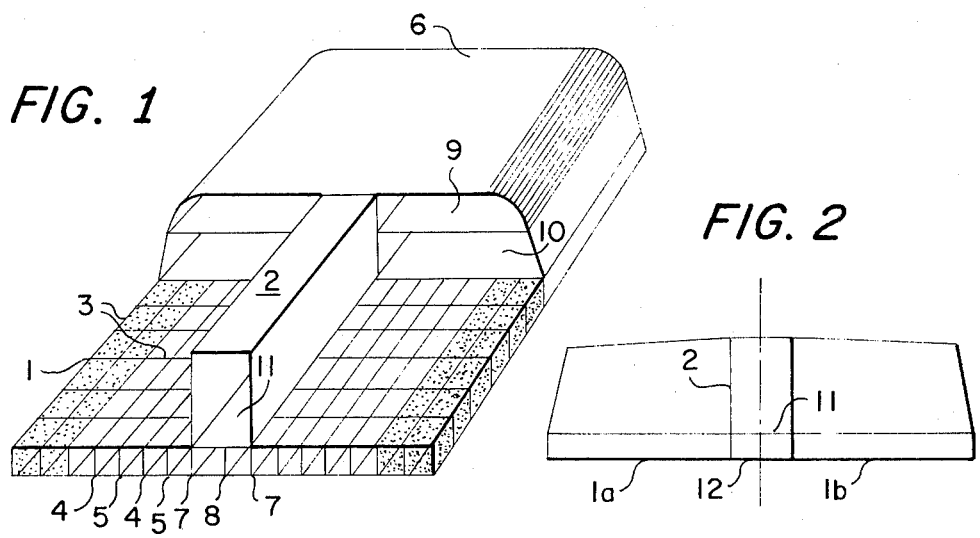
FIG. 1
FIG. 2
FIG. 3
FIG. 4
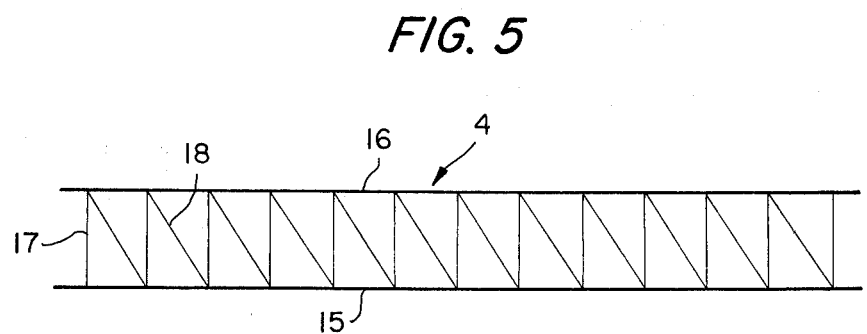
FIG. 5
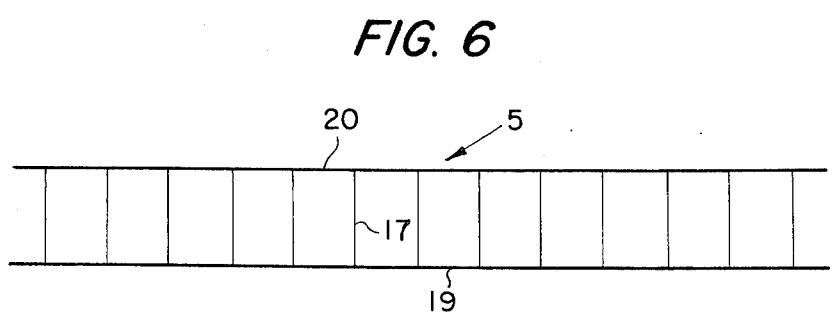
FIG. 6

GROUND EFFECT VEHICLE STRUCTURE

FIELD OF THE INVENTION

The present invention relates to hovering structures expecially intended for transportation of rolling loads, such as ground effect vehicles of average tonnage, capable of transporting land vehicles including heavy vehicles, as in the case of conventional transshipment craft.

BACKGROUND AND SUMMARY

The structure of a ground effect or air cushion (ACV) vehicle identifies the metallic assembly which on the one hand supports the superstructures, motor elements and payload and which on the other hand is supported at least in flight by the air cushion/cushions. In average tonnage ACV's of the type mentioned above, the said structure generally comprises an essentially rectangular platform supporting one or more longitudinal caissons or compartments, often symmetrical with reference to the long axis of the apparatus, inside which caissons it may be convenient to seat the heavy vehicles being transported. The platform is constituted for example by a rectangular reticulated grid formed of a plurality of longitudinal beams or girders which cross a plurality of transverse beams or cross girders supporting the floors. A certain volume of the said reticulated grid, generally at the periphery in order not to interfere with the air supply ducts for the cushion/cushions, is designed to ensure to buoyancy of the vehicle. The caissons are made of stiffened sheets assembled along four longitudinal ribs, and they bear on a plurality of transverse frames.

In the case of a single longitudinal caisson on the axis of the apparatus, such a structure is analogous to that of an airplane, the caisson resembling the fuselage, and the platform being analogous to wings running all along the fuselage. In longitudinal flexion the general stresses are accepted to major part by the central caisson. In transverse flexion they are accepted essentially by the platform, and in torsion, caisson and platform in varying degrees contribute to the total strength. On the other hand, local stresses on the floors due to the rolling loads that are transported are considerable. Consequently a structure of this kind presents two problems, one relating to connection of the caisson and platform, the other concerning the frame system of the platform.

So far as the connection of the caisson and the platform are concerned, two extreme solutions can first be imagined. The first consists in providing a central caisson that rises over the whole height of the structure. The modulus of inertia of longitudinal flexion is good, but the platform is actually split into two semi-platforms, the transverse stresses causing the connections of each half platform and the caisson to work independently, which makes it necessary to reinforce these connections and complicate them. Moreover, a floor that is sufficiently stong to receive the heavy vehicles must be provided horizontally in the caisson, which increases the weight of the structure. The second solution consists in having the caisson rest on the platform. The platform remains integral and without any break in continuity, which is favorable insofar as propagation of transverse and diagonal stresses is concerned. The lower part of the caisson can serve directly as support framing or armor for the heavy vehicle floor. However, the modulus of inertia of the caisson is clearly less good, the reduction of the value of the modulus has to be compensated by a reinforcement of the caisson, which substantially adds to the weight of the structure.

An object of the present convention consists in provision of a structure wherein the caisson and the platform are coupled so as to present the advantage of the two above solutions without their drawbacks, which allows production of an overall structure that is lighter.

As far as the frame system of the platform is concerned, what must be provided essentially is an arrangement of contiguous squares, to get a relatively undeformable platform, both for its production and servicing, and for hoisting.

An object of the present invention consists specifically in providing a relatively light platform while ensuring a certain indeformability.

According to a characteristic of the present invention, a ground effect vehicle structure is provided comprising a caisson and a platform, in which the caisson has its two lower longitudinal edges rigidly connected respectively to two principal or main girders in a grid of the platform, the crosswise portions between the two said main girders and slightly to either side thereof being reinforced.

According to another characteristic of the invention, certain girders of the platform, including the main girders, are lattice girders, while the others are ladder-structure girders, including the girder or girders between the two principal girders, the distribution of lattice girders and ladder girders being symmetrical with reference to the long axis of the vehicle.

Other characteristics of the present invention will become clear upon perusal of the following description of an example of embodiment, said description being presented with reference to the attached drawings.

DECRIPTION OF THE DRAWINGS

FIG. 1 is a schematic view in perspective with partial cutaway, of a ground effect vehicle structure according to the invention.

FIG. 2 is a schematic view in cross section of a known structure.

FIG. 3 is a schematic view in cross section of another known structure,

Figure 7:
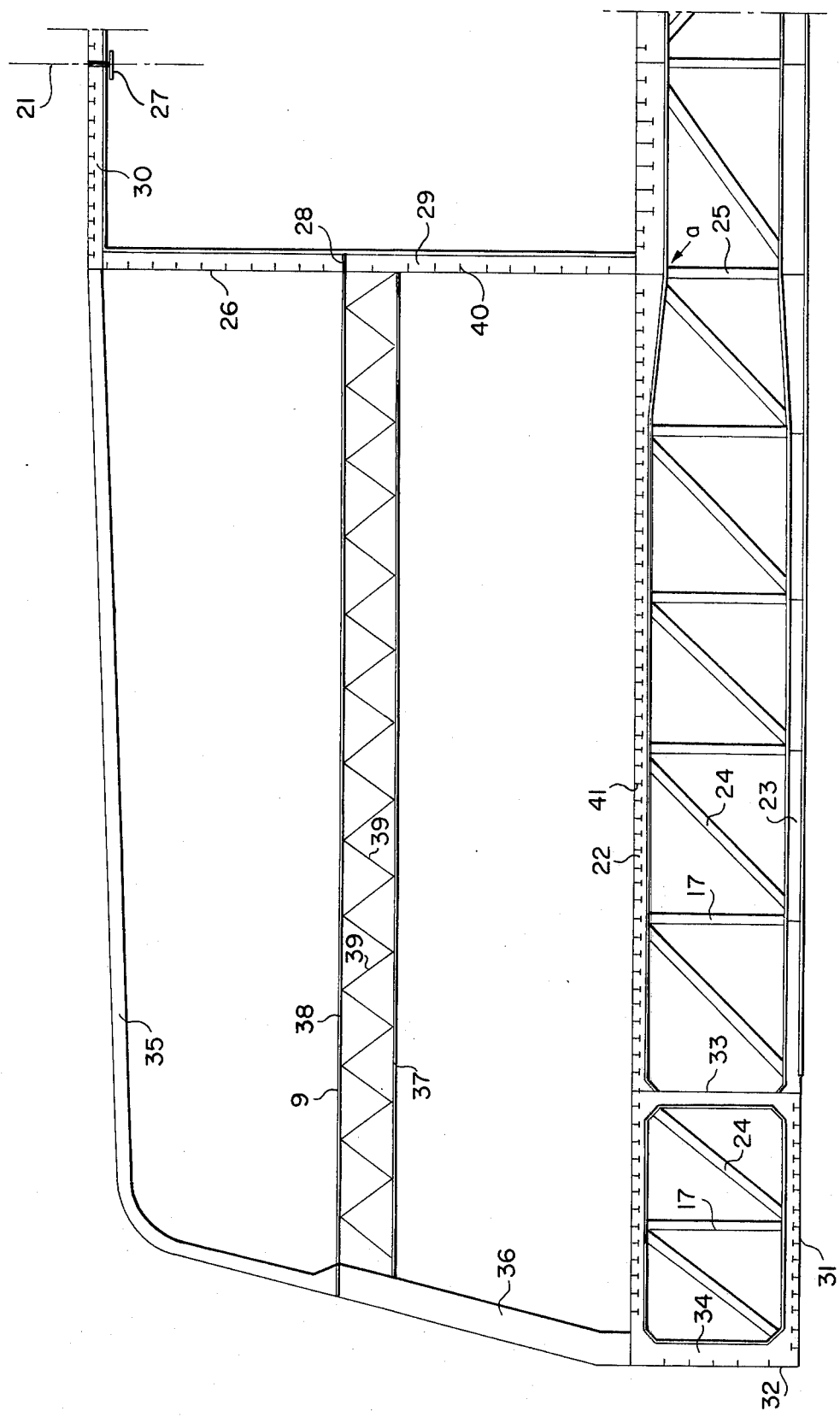
Figure 8:
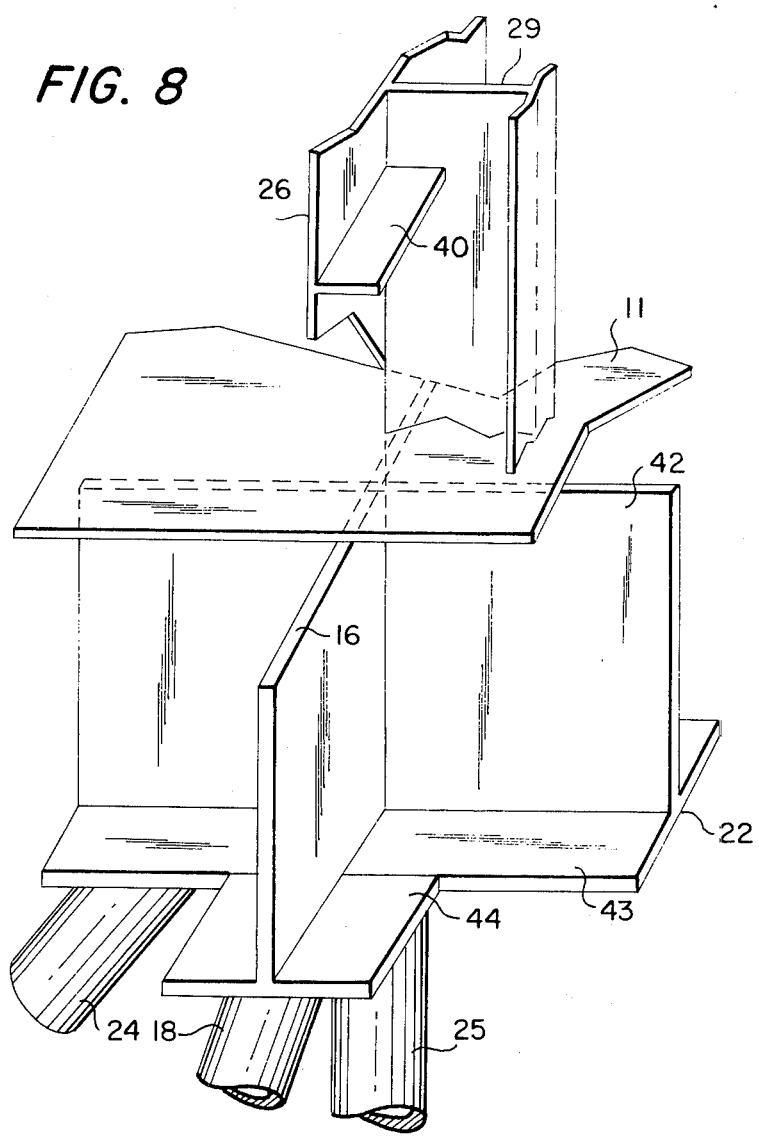
Figure 9:
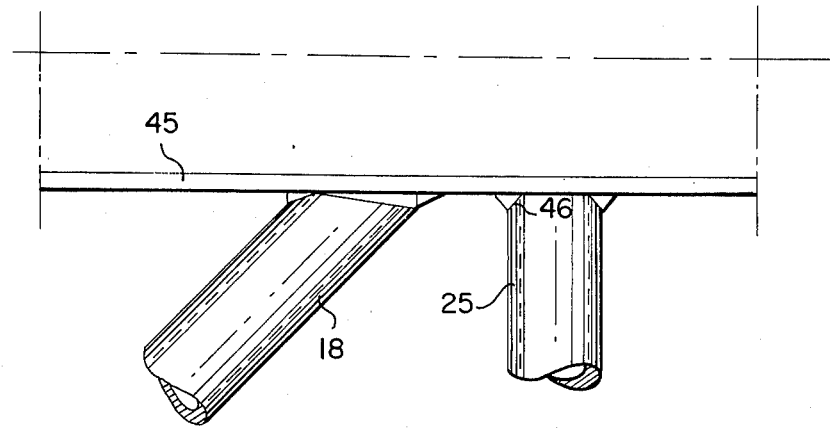

FIG. 4 is a schematic view in cross section of a structure according to the invention, FIG. 5 is a schematic view in elevation of a lattice girder, FIG. 6 is a schematic view in elevation of a ladder girder, FIG. 7 shows the midships section of a structure according to the invention, FIG. 8 is a view in perspective of node a illustrated in FIG. 7, and FIG. 9 is a view in section of the connection between tubes and a girder.

DESCRIPTION OF PREFERRED EMBODIMENT(S)

The ground effect vehicle of FIG. 1 comprises a platform 1 associated with a longitudinal caisson 2. Platform 1, generally rectangular in form, is constituted by a rectangular reticulated grid comprising crosspieces 3 and girders such as 4 and 5, girders 4 being reinforced in a lattice, whereas girders 5 are not reinforced and have a ladder structure. Crosspieces 3 are all lattice-reinforced. On either side of platform 1, beyond girders 4, there are buoyancy caissons intended to ensure flotation of the ACV when the lift fans are not operating, i.e., when the air cushions are not inflated. These float caissons are constituted by solid surfaces of stiffened sheet, represented by shaded areas in FIG. 1, bearing on a framework with a base of transverse frames. Girders 7 which are vertically aligned with the sides of caisson 2 are of the same type as 4, whereas the median girder 8, in the plane of symmetry of the ACV, is of the same type as 5. The ACV is supplemented by a covering frame 6 mounted on arcuate members joined to platform 1 and caisson 2, an upper bridge floor 9, a lower bridge floor 10 intended to receive light vehicles, and a floor 11 intended to support heavy vehicles seated inside caisson 2.

The section of FIG. 2 illustrates a known connection of caisson 2 and the platform, where caisson 2 rises over the whole height of the ACV from base 12. Thus, semi-platforms 1a and 1b are not directly interconnected and work independently of each other, which require reinforcement and complication of their connections with caisson 2. Moreover, floor 11 nonetheless has to be reinforced to be able to bear the load of the heavy vehicles.

The section of FIG. 3 shows another known connection of caisson and platform, where caisson 2 rests on platform 1 in a continuous arrangement. The lesser height of caisson 2 involves a modulus of inertia in longitudinal flexion that is clearly less good, and the caisson has to be reinforced, which increases its weight.

The section of FIG. 4 shows how the ACV of the invention has its platform connected to the caisson. Girders 7, disposed perpendicularly aligned with reference to the side walls of caisson 2, each comprise relatively heavy lower beams 13. Similarly, central girder 8 has a relatively heavy lower beam 14. Thus, by these beams, girders 7 and 8 contribute substantially to a raising of the modulus of inertia of longitudinal flexion of the ACV. On the other hand, if we consider crosspieces 3, these have beams with webs that are deeper under caisson 2, floor 1 being mounted on this part of the crosspieces, with intermediate frames between two crosspieces to reduce the bearing of the floor. Thus crosspieces 3 are not interrupted in their passage below caisson 2, which allows better propagation of transverse and diagonal stresses in platform 1.

FIG. 5 schematically shows a reinforced girder 4 comprising a lower beam 15, an upper beam 16, uprights 17 and oblique tubes 18. Beams 15, of straight I or T section, is interrupted at the loci of the transverse elements. Selection of the straight I or T section is a function of the probability of warping of the beam web according to the calculated stresses to which it may be subjected. Uprights 17 are made as tubes. Each upright 17 is common to a girder 4 and a crosspiece 3, the tubular structure allowing simple connection with the beams of the girder and the crosspiece as shown with reference to FIG. 8. Beam 16 has a straight T section, the foot of the T being at the bottom. It is interrupted at each crossing, while the upper edge of the web supports floor 10. The connections between tubes 17, 18 and the beams will be described in more detail with reference to FIG. 8.

FIG. 6 schematically shows a non-reinforced girder 5 comprising a lower beam 19, analogous to 15, an upper beam 20, analogous to 16, and uprights 17. It is noted that to a certain degree beam 19 can undergo longitudinal shifts with reference to beam 20 whereas in 4, tubes 18 prevent any relative motion of this kind between 15 and 16. It is to be observed that in FIG. 5, tubes 18 are all parallel although they may have their slants alternated.

FIG. 7 shows the section midships in an ACV with the structure of the invention, whereof the plane of longitudinal symmetry is shown at 21. More especially, FIG. 7 shows half of a crosspiece formed of a lattice girder comprising an upper T beam 22 whose web is continuous from one edge to the other of the ACV between the float caissons, a lower I beam 23, also uninterrupted, vertical uprights 17, likewise common to the girders, and oblique tubes 24. At the crossing with girder 7 (FIG. 1), upright 25 is slightly shorter than 17.

Central caisson 2 is constituted by an assembly of stiffened sheets 26, stuctured longitudinally by a T beam 27, under the roof, and a horizontal flanged stringer 28, as well as transversely by T beams 29 and 30.

FIG. 7 also shows the structure of the lateral buoyancy caissons which are constituted by sealed stiffened sheets 31, 32 and 33, and floor 10 (FIG. 1). They are transversely structured by girder ring 34 that extends beams 22 and 23.

FIG. 7 also shows arcuate members 35 of frame 6, which are constituted by ribs. The base of each arcuate member has a segment 36 that is wider and that is connected at its base to a beam 22 (as extended by ring girder 34). The top of each arcuate member is connected to an end of a beam 30. The lower part of frame 6 can be made of sheet that covers the arcuate members. The top part, above floor 9, for example, may be plastic.

Beams support floor 9, defining the upper deck. They comprise a lower beam 37 and an upper beam 38. Floor 9 is mounted on beams 38 in a conventional way. The connection between the beams of floor 9 and arcuate members 35 on the one hand and beams 29 on the other may comprise parts that are slightly movable so that transverse flexions of platform 1, entraining arcuate members 35, via 36, will not cause excessive deformation of the said arcuate members, the beams of floor 9 and/or uprights 29.

Of course, the structure is reinforced by conventional stiffening devices such as 40 between beams 29, or 41 between beams 22.

FIG. 8 shows node a of FIG. 7. Shown in perspective, we find there beam 22 of crosspiece 3, upright 29 of caisson 2, reinforced web 42 of 22, and tubular upright 25. It is to be noted in the rest of the description that unless otherwise indicated the beam web will have the same numerical reference as the beam, while its foot will be indicated by a different numerical reference. Beam 22 crosses upper beam 16 of girder 7. At the crossing, web 42 and foot 43 of 22 are continuous, longitudinal beam 16 consequently being interrupted on either side of 22. The webs of 22 and 16 are of the same height, and their feet are in the same plane. The sheets of floor 11 are welded onto the upper edges of webs 42 and 16. Above floor 11, sheet system 26 of the longitudinal wall of caisson 2 is perpendicularly aligned with web 16 while web 29 is perpendicularly aligned with 42. Stiffening elements 40 connect uprights 29 to each other. Tubes 25, 24 and 18 are directly welded onto feet 43 and 44.

FIG. 9 is a lateral view showing how normal tube 25 and an oblique tube such as 24 or 18 are welded to a foot schematically shown as 45. The end of tube 25 is bevelled at 46 and the weld is made between the bevel and the foot. Similarly, the end of the tube 18 is bevelled in an irregular way around the ellipse of the tube bearing, better to distribute the stresses.

We claim:

1. Ground effect vehicle structure comprising a platform constituted by a rectangular grid frame formed by a plurality of longitudinal girders crossing a plurality of transverse beam crosspieces, each girder and crosspiece comprising an upper beam portion and a lower beam portion bound together by uprights, two of said girders being main girders, and an upstanding longitudinal caisson formed of upstanding transverse rectangular frames interconnected by a continuous system of sheets, each frame having side segments and an upper segment, the lower segment of each frame of the caisson being constituted by the upper beam portion of a crosspiece, and the lower longitudinal edges of the caisson being integrated with the upper beam portions of said two main girders.

2. Ground effect vehicle structure as claimed in claim 1, wherein certain girders of the platform, including said main girders, are lattice girders, whereas others are ladder girders, including any girders between said two main girders, the distribution of lattice girders and ladder girders being symmetrical with reference to the longitudinal axis of the vehicle.

3. Ground effect vehicle structure as claimed in claim 2, characterized in that the girders and crosspieces are each constituted by an upper beam and a lower beam, the beams having vertical webs and lateral feet and being joined from place to place by tubes normal to the feet of the beams and welded at their ends thereto.

4. Ground effect vehicle structure as claimed in claim 3, wherein the lattice girders and the crosspieces include oblique tubes, with one oblique tube per frame defined by the two beams and two normal tubes, the said oblique tubes being oriented along a diagonal of the associated frame and welded at their ends to the feet of the beams.

5. Ground effect vehicle structure as claimed in claim 3 wherein below the caisson, the webs of the upper and lower beams of the crosspieces are relatively deepened, and in that the webs of the upper and lower beams of said main girders as well as those of any ladder girders between them are also relatively deepened.

6. Ground effect vehicle structure as claimed in claim 5 wherein the caisson is reinforced by a longitudinal beam disposed along its ceiling in the longitudinal axis of the vehicle.

7. Ground effect vehicle structure as claimed in claim 6 wherein the caisson is reinforced by two horizontal stringers disposed respectively, substantially at mid-height, along upstanding walls of the caisson.

8. Ground effect vehicle structure as claimed in claim 4 wherein the normal and oblique tubes are bevelled at their ends, toward the outside, the weld between a foot and the corresponding end of a tube being made between the surface of the bevel and that of the foot.

9. Ground effect vehicle structure as claimed in claim 3 wherein said crosspieces are continuous and said girders are interrupted by said crosspieces, the sheets of the side walls of the caisson being vertically planar with the webs of the respective main girders.

* * * * *